US012620401B2

(12) United States Patent
Steven et al.

(10) Patent No.: US 12,620,401 B2
(45) Date of Patent: May 5, 2026

(54) ACOUSTIC PATTERN DETERMINATION

(71) Applicant: Hewlett-Packard Development Company, L.P., Spring, TX (US)

(72) Inventors: Christopher Steven, Spring, TX (US); Robert Campbell, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 168 days.

(21) Appl. No.: 18/262,169

(22) PCT Filed: Jan. 29, 2021

(86) PCT No.: PCT/US2021/015797

§ 371 (c)(1),
(2) Date: Jul. 19, 2023

(87) PCT Pub. No.: WO2022/164448

PCT Pub. Date: Aug. 4, 2022

(65) Prior Publication Data

US 2024/0087586 A1 Mar. 14, 2024

(51) Int. Cl.
*G10L 21/0208* (2013.01)
*G10L 21/00* (2013.01)

(52) U.S. Cl.
CPC ................................ *G10L 21/0208* (2013.01)

(58) Field of Classification Search
CPC ................. G10L 21/00; G10L 21/0208; G10L 2015/088; G10L 15/22; G10L 2015/223; G10L 2015/226; G10L 2015/227; G10L 2015/228; G10L 21/02; G10L 2021/02085; G10L 2021/02087; G10L 21/0216; G10L 2021/02168; G10L 21/0224; G10L 21/0232; G10L 21/0264; G10L 21/0364; G10L 21/043; G10L 21/045; G10L 21/047; G10L 21/049; G10L 21/055; G10L 21/057; G10L 2021/0575; G10L 17/02; G10L 15/08; G10L 2015/086; G10L 25/84;
(Continued)

(56) References Cited

U.S. PATENT DOCUMENTS 5,848,384 A * 12/1998 Hollier .................... H04M 3/22
704/E15.045
7,065,198 B2 6/2006 Brown et al.
(Continued)

FOREIGN PATENT DOCUMENTS

CN 107705786 A 2/2018
JP 05-188961 A 7/1993
(Continued)

OTHER PUBLICATIONS

Google search, User Manual of Sound Forge Audio Studio 12—Introductory video Tutorial—YouTube, Aug. 2017.*

*Primary Examiner* — Leshui Zhang
(74) *Attorney, Agent, or Firm* — Quarles & Brady LLP

(57) ABSTRACT

According to an example, a method comprises receiving a first audio stream from an input device, detecting presence within the first audio stream of at least an acoustic pattern, executing at least one corrective action over a portion of data of the first audio stream including the acoustic pattern such that a second audio stream is obtained, and transmitting the second audio stream to an output device.

14 Claims, 3 Drawing Sheets

200

(58) Field of Classification Search

CPC ......... G10L 25/48; G10L 17/00; G10L 17/06; G10L 17/08; G10L 17/10; G10L 17/12; G10L 17/14; G10L 21/034; G10L 2021/03643; G10L 2021/03646; G10L 21/0316; G10L 21/0332; G10L 21/0356; G10L 21/0324; G10L 25/21; G10L 25/15; G10L 13/033; G10L 13/0335; G10L 13/04; G10L 13/047; G10L 13/06; G10L 13/07; G10L 21/0272; G10L 21/028; G10L 21/0308; G10L 25/18; G10L 25/54; G10L 25/51; G10L 25/60; G10L 25/63; G10L 25/66; G10L 25/69; G10L 25/72; G10L 15/05; G10L 15/04; G10L 19/018; G10L 19/26; G10L 19/265; G10L 2021/0135; G10L 21/013; G10L 21/01; G10L 21/007; G10L 21/003; H04M 2201/40; H04M 2203/6009; H04M 1/27485; H04M 2201/405; H04K 1/04; H04K 3/45; H04K 3/00; H04K 3/825; H04K 3/86; H04K 3/41; H04K 3/42; H04K 3/43; H04K 2203/12; H04K 1/00; G06F 3/167; G06F 3/016; G06F 3/165

USPC ....... 704/226, 221, 214, 213, 215, 216, 223, 704/233; 381/312–321, 92, 98–103, 104, 381/106, 107, 110, 118, 119, 120, 122

See application file for complete search history.

(56) References Cited

U.S. PATENT DOCUMENTS 7,130,404 B2 10/2006 Coles et al.
8,249,233 B2 8/2012 Loupia et al.
8,295,462 B2 10/2012 Miller et al.
8,731,935 B2 5/2014 Chavez et al.
8,879,895 B1 * 11/2014 Bussieres ................. H04N 5/91 386/285
9,112,978 B2 8/2015 Gilbert et al.
9,112,979 B2 8/2015 Gilbert et al.
2002/0128834 A1 * 9/2002 Fain ........................ G10L 15/10 704/E15.04
2008/0167879 A1 * 7/2008 Du Bois ................. G10L 15/04 704/E15.04
2012/0054611 A1 * 3/2012 Perrodin ................ G11B 27/34 715/716
2013/0322856 A1 * 12/2013 Oh ........................... H04N 9/79 386/280
2014/0281986 A1 * 9/2014 Hsu ...................... G11B 27/031 715/716
2015/0019126 A1 1/2015 Kozloski et al.
2020/0099792 A1 3/2020 Nguyen et al.

FOREIGN PATENT DOCUMENTS

JP 05-197385 A 8/1993
JP 2702647 B2 1/1998
JP 2010-210800 A 9/2010
KR 10-2019-0052443 A 5/2019
WO 2011/148230 A1 12/2011

* cited by examiner

ACOUSTIC PATTERN DETERMINATION

BACKGROUND

When using electronic devices, such as computing devices, users may play audio data through output devices such as speakers, earphones, or headphones. Such audio data may comprise different types of sound, for instance sounds within the hearing range of humans, inaudible sounds for the human ear, soft sounds, loud sounds, noise, and music, amongst others. The sources of the audio data may be, for instance, a readable-memory belonging to the electronic device, an external readable-memory connected to the electronic device, or a remote location accessible through the Internet.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1:
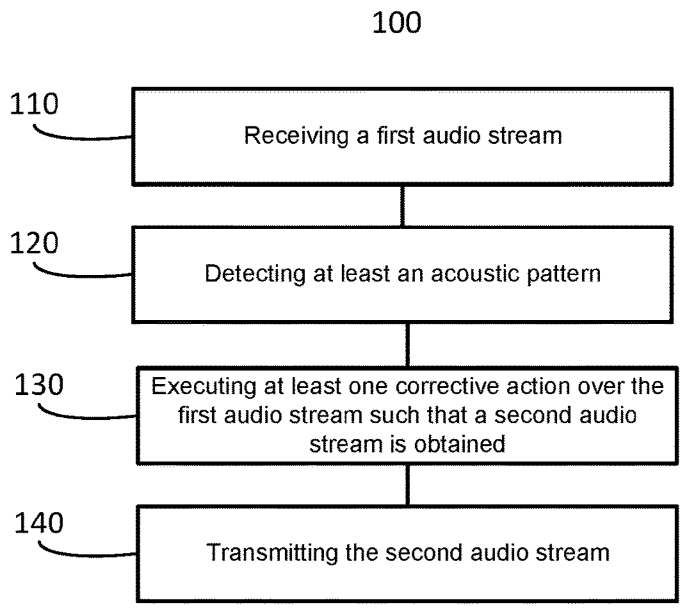
FIG. 1 shows a method to determine the presence of an acoustic pattern in an audio stream, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms “a” and “an” are intended to denote at least one of a particular element. As used herein, the term “includes” means includes but not limited to, the term “including” means including but not limited to. The term “based on” means based at least in part on.

Electronic devices may be used to reproduce audio data received from input devices. Such input devices may be within the electronic device, for instance a memory of the electronic device, or may be remote to the electronic device. Examples of remote input devices may be an external electronic device connected to the electronic device, a remote location accessible through a network such as the Internet, or microphones of an external electronic device locally connected to the electronic device and/or connected via a network. In order to play the sound associated with the audio data, the electronic devices comprise output devices. In the same way as the input devices, the output devices may belong to the electronic devices, for instance a speaker of the electronic device, or may be an external output device connected to the electronic device, for instance earphones, headphones, or external speakers. The selection of a specific type of output device may depend on the preferences of the user or other factors, such as the device(s) availability. Hence, when having multiple output devices available, the user may select one of them at their discretion.

Throughout this description, the term “electronic device” refers generally to electronic devices that are to receive audio data and to transmit the audio data to an output device in order to reproduce it. Examples of electronic devices comprise displays, computer desktops, all-in-one computers, portable computers, printers, smartphones, tablets, and additive manufacturing machines (3D printers), amongst others.

When selecting an output device, users may take into account aspects such as where they are using the electronic device, the presence of people or additional electronic devices nearby the electronic device, or the applications running in their own electronic device. In some cases, the electronic devices located nearby to the output device or the electronic device itself may comprise personal assistant application(s) that are invoked by the usage of a keyword. Therefore, if the audio data received by the input device and subsequently played through the output device contains that keyword, the keyword may activate or wake-up the personal assistant application of the own electronic device or electronic devices located nearby the output device.

Since most electronic devices such as computers and smartphones have personal assistant applications invoked by a keyword, the usage of output devices that reproduce the audio data has implicit the risk of invocating third-party applications in the user’s electronic device or electronic devices located nearby the output device.

Examples of keywords used to invoke personal assistant applications may be “Ok Google”, “Alexa”, “Hey, Cortana”, “Hey, Siri”, amongst others. Hence, if the audio data received by the electronic device contains at least one of these keywords, a personal application(s) associated with the keyword(s) may be triggered if the output device selected for the electronic device enables the personal assistant application(s) to hear such keyword(s). Because most of the time users are not aware of the content of the sound data beforehand, this scenario creates uncertainty for users because of its unpredictability. For instance, when users are attending a conference call, the speaker may pronounce one of the keywords. Subsequently, the listeners will receive in their electronic devices audio data that, when reproduced in their output device(s), may trigger an action from any personal assistant application nearby the user(s) having enough range to hear the keyword, if any.

In order to reduce the risk of unexpectedly triggering a personal assistant application, users may turn off all the personal assistant applications of the electronic device and the electronic devices located nearby when an output device of the electronic device is to reproduce sounds associated with sound data. However, even though, in some scenarios, users will be able to turn off (or temporary block) all the personal assistant applications, this approach is time-consuming for users. Further, users may desire to intentionally utilize such personal assistant applications while also utilizing the audio output device. An alternative approach may be to use as output devices earphones or headphones instead of speakers in order to avoid other electronic devices hearing the sounds. However, in some cases the usage of speakers is inevitable.

In order to effectively improve the transmission of audio data in an electronic device by reducing the risk of triggering personal assistant applications, methods to correct the audio data may be used. In the same way, systems may be used so as to reduce the risk of invoking or waking-up personal assistant applications in the electronic device or the electronic devices located nearby.

According to some examples, personal assistant applications associate keywords with acoustic patterns. Therefore, even though specific keywords are not strictly pronounced sound outputted by the output devices, the personal assistant applications may be woken-up or invoked. In an example, an acoustic pattern comprises a frequency pattern and an amplitude pattern within a time frame (or cadence time frame). Hence, if a sound matches the frequency and the amplitude patterns within the cadence time frame, the personal assistant applications will identify the sound as a keyword and an action will be triggered. In some cases, each of the frequency pattern, the amplitude pattern, and the cadence time frame comprises a tolerance range, i.e., there are multiple values of frequency, amplitude and cadence time frame indicating the presence of a keyword.

According to other examples, personal assistant applications may be invoked by sound which may be inaudible for human hearing. Based on the non-linearity of the microphones used by the electronic devices containing the personal assistant applications, a third-party may send to the electronic device of the user sounds which are inaudible for the user but within the hearing range of the personal assistant application. In some examples, these sounds may be embedded within audio or video segments.

Referring now to FIG. 1, a method 100 to determine the presence of an acoustic pattern in an audio stream is shown. The acoustic pattern, when listened to by an electronic device having a personal assistant application, may launch an application or may execute an action. As described above, the acoustic pattern may be within a human hearing audible range or outside the audible range for humans.

At block 110, method 100 comprises receiving a first audio stream. The first audio stream may be received, for instance, from an input device. In an example, an electronic device receives the first audio stream through the input device. The first audio stream represents sound data to be outputted by an output device of the electronic device. In an example, the output device may be a speaker. At block 120, method 100 comprises detecting presence within the first audio stream of at least an acoustic pattern. The acoustic pattern may be detected, for instance, by using a data-processing system to determine a portion of data including an acoustic pattern. Since different keywords may be possible, block 120 comprises detecting an acoustic pattern of the set of acoustic patterns. Hence, by comparing the first audio stream with patterns that would launch (or invoke) a personal assistant application, method 100 compares a portion of the first audio stream with a pattern. At block 130, method 100 comprises executing at least one corrective action over a portion of data of the first audio stream including the acoustic pattern such that a second audio stream is obtained. By applying at least one corrective action, the first audio stream is modified to compensate for the presence of the acoustic pattern within the second audio stream. In an example, the corrective actions comprise jamming the portion of data of the first audio stream including the acoustic pattern, omitting the portion of data of the first audio stream including the acoustic pattern, and applying an audio scrambler over the portion of the first audio stream including the acoustic pattern. At block 140, method 100 comprises transmitting the second audio stream to an output device. Since the second audio stream does not contain acoustic pattern(s) associated with the keyword(s), or compensates for the presence of the acoustic pattern(s), playing the second audio stream with the output device will not unexpectedly trigger personal assistant applications.

As used herein, the term "jamming" refers to a modification of the energy levels of a portion of sound data in order to change the pressure levels generated upon the portion of sound data is outputted by an output device.

As used herein, the term "audio scrambling" refers to the modification of a portion of sound data by adding additional audio data such that the resulting portion of sound data is distorted.

In some examples, method 100 may further comprise applying a filter over the second audio stream, wherein the filter comprises filtering frequencies that are outside of a frequency range, and filtering energy levels that are outside an energy range. By filtering the frequency and energy levels, the inadvertent usage of inaudible sounds to launch personal assistant applications in listening devices will be prevented. Hence, if method 100 includes frequency filters and energy level filters, the usage of inaudible sounds to launch, invoke, or execute personal assistant applications is prevented.

Figure 2:
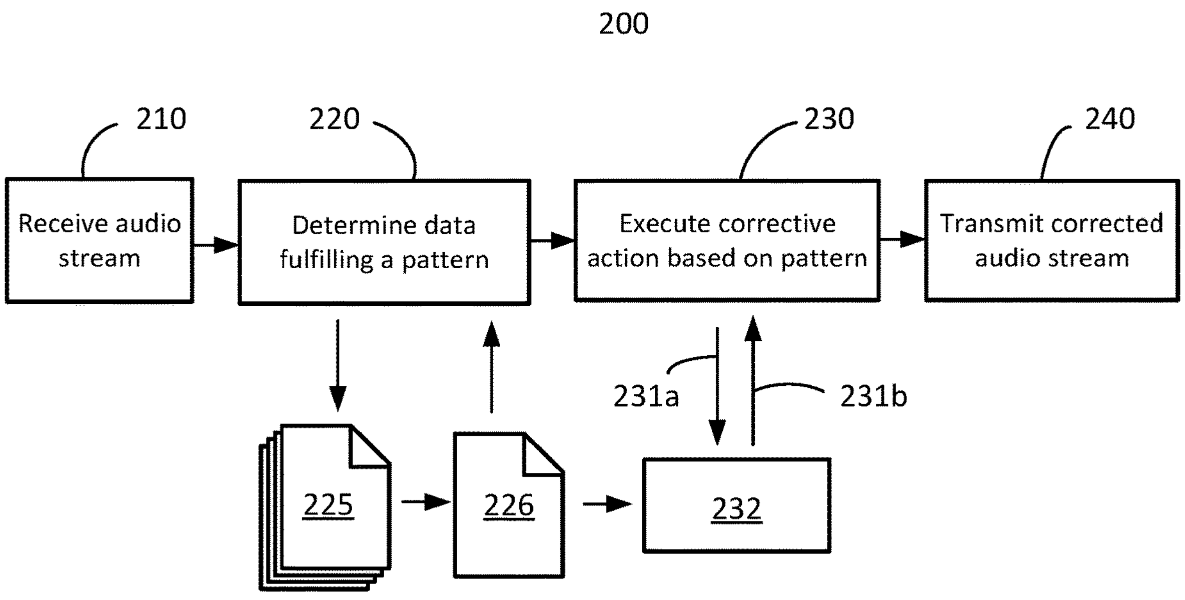
FIG. 2 shows a flowchart representing the selection of a corrective action, according to an example of the present disclosure.

Referring now to FIG. 2, a flowchart 200 representing the selection of a corrective action is shown. As previously described, different corrective actions may be applied over a portion of data including an acoustic pattern associated with a keyword. The selection of a corrective action may be based on, for instance, the keyword associated with the acoustic pattern, the time at which the acoustic pattern appears in the audio data, the potential impact(s) of the corrective action(s), amongst others.

The flowchart 200, at block 210, represents the receipt of an audio stream. The audio stream may be received, for instance, from an input device. Upon the audio stream being received, block 220 determines whether or not data within the audio stream fulfills or matches a pattern of one acoustic pattern of a set of acoustic patterns 225. For instance, in FIG. 2 it is determined that a portion of data of the audio stream matches with an acoustic pattern 226. Alternatively, the acoustic patterns and the set of acoustic patterns 225 may be referred to as behavior patterns and set of behavior patterns, respectively. In order to identify the portion of data matching with the acoustic pattern 226, the determination may be performed by using a data-processing system such as an Artificial Intelligence (AI) enabled audio processor. The data-processing system may monitor the input audio stream such that if a portion of data included in the audio stream matches with a set of characteristics of one acoustic pattern, a corrective action is scheduled to happen over the portion of data.

Then, at block 230, a corrective action 232 is executed over a portion of data 231*a* satisfying the acoustic pattern 226. As indicated by the arrow between the acoustic pattern 226 and the corrective action 232, the corrective action 232 may be selected based on the acoustic pattern 226. However, in other examples, the corrective action 232 may be selected based on the preferences of the user. Upon the corrective action 232 being executed over the portion of data 231*a*, a corrected portion of data 231*b* is obtained. The corrected portion of data 231*b*, which compensates for, or no longer contains the acoustic pattern 226, is subsequently inserted into the audio stream in order to replace the portion of data 231*a*, thereby providing a different audio stream with respect to the audio stream received from the input device, i.e., a corrected audio stream. At block 240, the corrected audio stream is transmitted to an output device. Since the portion of data 231*a* is no longer included in the audio stream, users may reproduce the corrected audio stream through any kind of output device while not waking-up or invoking personal assistant applications in either their own electronic device or electronic devices located nearby.

In some examples, the corrective action may be selected based on users' preferences. Hence, if users aim to omit the acoustic patterns determined at block 220 from the audio stream, the corrective action may comprise modifying the audio stream received at block 210 to omit the portion of data 231*a*. Hence, the corrected portion of data 231*b* may include a sound wave having low energy levels, such as a sound wave having a null amplitude. In other examples, the corrective action 232 may comprise replacing the portion of data 231*a* for a pre-defined acoustic signal, such as a beep signal.

In some other examples, users may consider minimizing as much as possible the effects derived from the modifications over the audio stream. Hence, even though users aim to remove the acoustic patterns from the audio stream, they may be interested in keeping the keyword(s) associated with such acoustic patterns in the corrected audio stream such that the personal assistant application cannot detect them. Hence, instead of omitting the portion of data 231*a* for a corrected portion of data 231*b*, the corrective action 232 may comprise modifying specific characteristics of the portion of data 231*a* so that is not identified as an acoustic pattern, but the keyword(s) is still audible and/or recognizable by users. Examples of characteristics that can be modified in order to obtain keywords that do not satisfy the acoustic pattern but are still recognizable by the users are modifying the frequency, modifying the energy levels of the audio data, modifying the time to reproduce the sound data, or a combination thereof. In some examples, the corrective action may comprise partially modifying the portion of data 231*a* instead of modifying the whole portion of data 231*a*.

According to some examples, an acoustic pattern associated with a keyword comprises parameters defining the sound of the keyword. The acoustic pattern, when outputted by an output device, may be identified by personal assistant applications as the keyword. Since sound travels in compression waves made up of areas of increased pressure called compressions and areas of decreased pressure called rarefactions, sounds can be represented as a series of physical parameters such as frequency and amplitude. The amplitude of a sound indicates the amount of energy that the wave carries. As the energy increases, the intensity and volume of the sound increases. The frequency of a sound indicates the number of wavelengths within a unit of time, a wavelength being the distance between two crests or two troughs. Hence, since keywords can be characterized by these physical parameters, electronic devices are capable of determining the presence of a keyword by identifying the presence of these patterns corresponding to such keyword during a time frame, or cadence time. For instance, in the examples of FIG. 1 and FIG. 2, the audio data received from the input device is compared with a set of acoustic patterns associated with a set of keywords. If any of the acoustic patterns are identified within the audio data, the sound, when outputted by an output device, will be interpreted by personal assistant applications as the keyword associated to the acoustic pattern found within the audio data.

Figure 3:
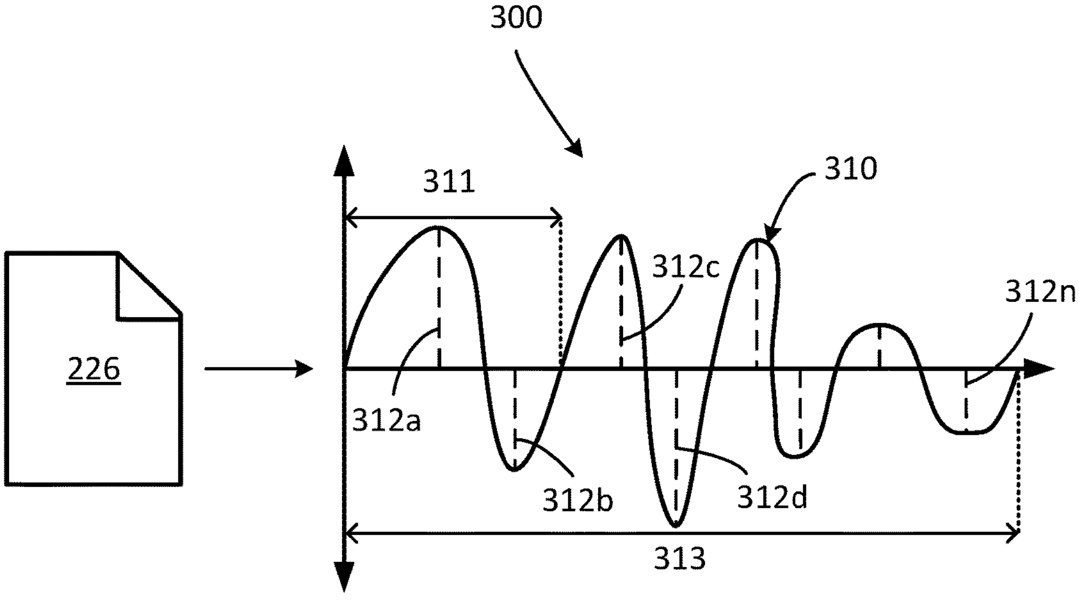
FIG. 3 shows a set of characteristics of an acoustic pattern, according to an example of the present disclosure.

Referring now to FIG. 3, a set of characteristics 300 of an acoustic pattern 226 is shown. The set of characteristics 300 represents the patterns or behaviors of multiple parameters in order to be identified as the acoustic pattern 226. The acoustic pattern 226, as previously described, may be associated with a keyword. In the example of FIG. 3, the set of characteristics 300 is represented as a pattern wave 310. The pattern wave 310, when outputted by an output device and subsequently heard by a personal assistant application, may be identified as a keyword. The Y-axis of the set of characteristics represents amplitude values and the X-axis represents time. Along the time represented in the set of characteristics 300, the pattern wave 310 changes its amplitude value and its frequency within a time frame 313. Since the pattern wave 310 is a combination of single-frequency waves, the resultant frequency is not constant. For example, in the example of FIG. 3 the pattern wave 310 takes a time 311 to execute a cycle, i.e., the frequency of the pattern wave 310 is one divided by the time 311. However, for subsequent cycles, the frequency changes. In a similar way, in FIG. 3, the amplitude of the pattern wave 310 is not constant within the time frame 313. A first amplitude 312*a* is obtained in the first crest. However, a first trough has a second amplitude 312*b* different to the first amplitude 312*a*. The subsequent crest has a third amplitude 312*c* and the subsequent trough a fourth amplitude 312*d*. In the example of FIG. 3, the pattern in the amplitude and the frequency within the time frame 313 may be associated to the presence of a keyword. Hence, if a similar pattern in amplitude (for instance an audio stream comprising crest and trough amplitude values from 312*a* to 312*n* within the time frame 313) and frequency (the audio stream comprises frequency values corresponding to the pattern wave 310 within the time frame 313) is determined to be contained within an audio data, the audio data is determined to include a keyword.

According to other examples, multiple pattern waves may be possible for the same keyword. Hence, different amplitude values and/or frequencies may be associated with the same keyword. In some other examples, the pattern waves comprise ranges for the frequency and/or the amplitude. Hence, when determining if a portion of data comprises a pattern, ranges for the amplitude and/or the frequency may be used. Similarly, the time frame of the pattern wave may have multiple possible values (for instance a range of values from 1 second to 2 seconds).

Figure 4:
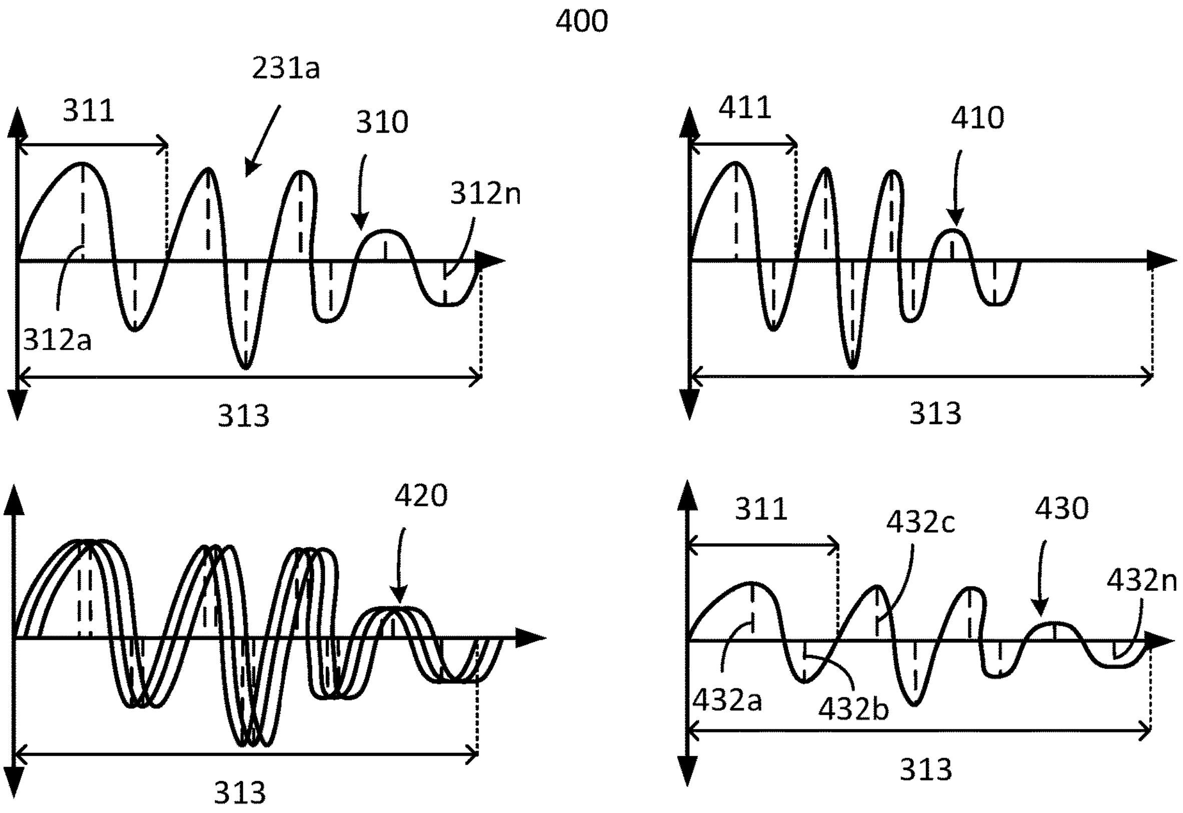
FIG. 4 shows a series of charts representing pattern waves, according to an example of the present disclosure.

Referring now to FIG. 4, a series of charts 400 representing pattern waves are shown. The upper left chart represents a pattern wave 310 of the portion of data 231*a*, wherein the pattern wave 310 may correspond with the acoustic pattern associated with a keyword, as previously explained in reference with FIG. 3. The portion of data 231*a* may be, for instance, the portion of data 231*a* previously described in reference with FIG. 2. In order to avoid the presence of the acoustic pattern, corrective actions may be executed over the portion of data 231*a*. As previously described in FIG. 3, the pattern wave 310 comprises an amplitude behavior and a frequency pattern within a time frame 313. Initially, the pattern wave 310 has a period equal to a time 311 which does not remain constant along the time frame 313, i.e. the frequency is one divided by the time 311. Regarding the amplitude, the consecutive amplitude values for crests and troughs is 312*a* to 312*n*.

The series of charts 400 further comprises a first corrective action represented on the upper right chart. The corrective action comprises modifying the frequency values such that the frequency pattern of the corrected portion of data does not match with the frequency pattern of the pattern wave 310. In order to modify the frequency pattern within the time frame 313, the amplitude values of the pattern wave 310 are maintained but the frequency is increased, thereby resulting in a first corrected wave 410. The first corrected wave 410 takes a corrected time 411 for a full cycle, i.e., a corrected frequency of one divided by the corrected time 411. As a result, the personal assistant applications won't recognize the keyword associated with the pattern wave 310 because the pattern wave 310 has been replaced by the first corrected wave 410. In some examples, the frequency is partially modified during a portion of the time frame 313 instead of modifying the pattern wave 310 during the entire time frame 313. In other examples, the frequency may be decreased instead of increased. In some other examples, the frequency is increased as much as the first corrected wave 410 is still audible by the human hearing. In further examples, the pattern wave 310 experiences both increases of frequency and decreases as long as the acoustic pattern does not match with the resulting wave.

The series of charts 400 further comprises a second corrective action represented on the bottom left chart. The corrective action comprises applying an audio scrambler to the pattern wave 310 such that a second corrected wave 420 is obtained. The second corrected wave 420, when outputted by an output device, will reproduce a sound that won't be detected as the keyword. Because the amplitude and the frequency of the pattern wave 310 will have changed, the personal assistant applications won't be capable of recognizing the keyword associated with the pattern wave 310. In the example represented in FIG. 4, the audio scrambler adds additional sound data to the portion of data 231*a* such that the resulting audio data is distorted. In other examples, the audio scrambler may comprise adding a predefined sound data to the portion of data 231*a* such that the resulting data is distorted. Since the corrected wave 420 won't match with the acoustic pattern associated with the keyword, any of the personal assistant applications positioned nearby to the output device won't detect the keyword within the corrected portion of data associated with the second corrected wave 420. As previously explained in reference to the first corrective action, in other examples, the audio scrambler may be applied over a part of the pattern wave 310 instead of the whole pattern wave 310

On the bottom right chart, a third corrective action is represented. The third corrective action comprises jamming the pattern wave 310 by modifying the amplitude values such that a third corrected wave 430 is obtained. The third corrected wave 430, when outputted by an output device, will reproduce a sound which won't be detected as the keyword because of the changes in the energy levels with respect to the acoustic pattern associated with the keyword. The modification of the energy levels of the audio data, when outputted by an output device, will generated different pressure levels. Since the personal assistant application comprise a range for pressure levels, the third corrective wave when outputted by the outputted device won't be recognized as the keyword. In the same way as the first corrective action and the second corrective action, the third corrective action may be applied to a portion of the pattern wave 310. In other examples, instead of reducing the amplitude values, the third corrective actions comprise increasing the amplitude. In further examples, both increases and decreases are performed over the pattern wave 310 as long as the acoustic pattern is not fulfilled by the resulting wave.

In some other examples, multiple corrective actions may be applied over the portion of data 231*a* having the pattern wave 310. Therefore, partial and/or total changes of frequency, partial and/or total changes of amplitude, and partial and/or total audio scrambling may be performed over the portion of data 231*a*. In other examples, different types of corrective actions may be used such as omitting the portion of data 231*a* from the audio stream, as previously explained in reference to other examples.

According to some examples, a pattern likelihood (or behavior likelihood) for each acoustic pattern may be determined based on portion of data of an audio stream. The pattern likelihood may represent an accomplished portion of the acoustic pattern with respect the complete acoustic pattern. In other words, the pattern likelihood monitors, based on a portion of data, if an acoustic pattern is likely to be present. Hence, even though the set of characteristics associated with a keyword have not been completely found, the pattern likelihood may indicate how close a portion of data is to the whole acoustic pattern. Therefore, in case of measuring that one of the pattern likelihoods has reached a threshold value, a corrective action may be executed over the remaining data such that a personal assistant application won't recognize the keyword because the acoustic pattern is not completely found in the audio outputted by the output device. In an example, a first likelihood may be 66%, a second likelihood is 50% and a third likelihood is 78%. If the threshold value is 75%, a corrective action may be triggered in order to modify the portion of data which will potentially contain the remaining 22% of the acoustic pattern associated with the third likelihood. If the threshold value is set at 65%, a corrective action may be triggered in order to modify the portion of data which will potentially contain the remaining 34% of the acoustic pattern associated with the first likelihood and the remaining 22% of the acoustic pattern associated with the third likelihood. In some examples, corrective actions may be selected based on behavior likelihood that exceeds the threshold value.

Figure 5:
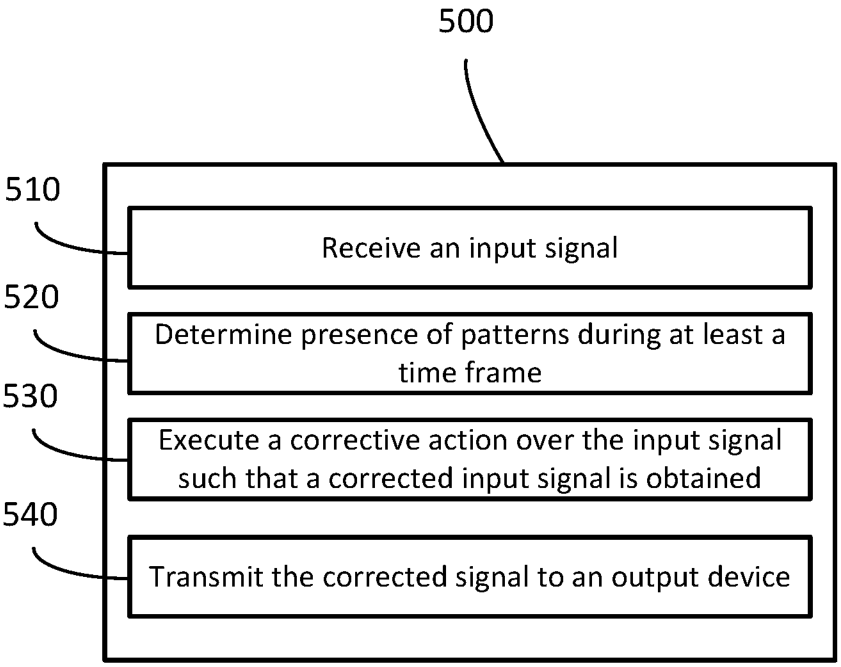
FIG. 5 shows a non-transitory computer-readable medium comprising instructions, according to an example of the present disclosure.

Referring now to FIG. 5, a non-transitory computer-readable medium 500 comprising instructions is shown. Examples of computer-readable medium comprise any non-transitory tangible medium that can embody, contain, store, or maintain instructions for use by a processor. Computer readable media include, for example, electronic, magnetic, optical, electromagnetic, or semiconductor media. More specific examples of suitable computer readable media include a hard drive, a random access memory (RAM), a read-only memory (ROM), memory cards and sticks and other portable storage devices. The instructions, when executed by a processor, may cause a system to execute a series of actions. In an example, the system may be an electronic system such as a computing system. Examples of processor comprise a microprocessor, a microcontroller, or an application-specific integrated circuit. The instructions within the computer-readable medium 500 comprise: receive an input signal 510, determine presence of patterns during at least a time frame 520, execute at least a corrective action over the input signal to modify input signal during the time frame such that a corrected input signal is obtained 530, and transmit the corrected input signal to an output device 540. As previously explained, the input signal may be received from an input device within the system or outside the system.

In order to determine presence of patterns during at least a time frame 520, the system may compare audio data within the input signal with a set of characteristics associated with a specific pattern. If the set of characteristics match with the input data, the audio data is determined to contain data a pattern associated with a keyword that may invoke a personal assistant application. In an example, the set of characteristics is the set of characteristics 300 previously described in FIG. 3.

Upon determination of presence of a pattern associated with a keyword within the input data, a corrective action is executed over a portion of data including the pattern. Examples of corrective actions comprises scrambling a portion of the input data, modifying the frequency pattern of a portion of the input data, modifying the amplitude pattern of a portion of the input data, omitting portions of audio data, amongst others. In other examples, multiple corrective actions may be executed over the portion of data. In some other examples, the corrective actions comprise the examples of first, second and third corrective actions previously described in reference with FIG. 4.

In some examples, the computer-readable medium 500 comprises further instructions to cause the system to determine a pattern likelihood for each pattern of the set of patterns and execute a correction action over the input data if one of the pattern likelihoods exceeds a threshold value. As described above, the pattern likelihood may represent an accomplished portion of the pattern, i.e. how much pattern has been found in the input data. Hence, if one of the pattern likelihoods exceeds a threshold value, the corrective action is executed over an expected remaining portion of the pattern. In other examples, the corrective action is executed over the portion of the input data that has contributed to the pattern likelihood, i.e. having a common pattern(s) with a pattern of the set of patterns. In some other examples, different threshold values may be defined for different patterns.

In some other examples, execute a corrective action over the input signal to modify input data during the time frame comprises one of applying to the input data a filter to modify the behavior during the time frame and omit from the input data the time frame containing the pattern.

In further examples, the corrective action executed over the input data if one of the pattern likelihoods exceeds a threshold value is selected based on the pattern of the set of patterns for which the threshold value is exceeded, i.e., the corrective action is selected based on the keyword that could invoke a personal assistant application.

According to some examples, the computer-readable medium 500 comprises further instructions to cause the system to read from a memory the set of patterns, receive user input from a user interface, and modify the set of patterns based on the user input. Since the patterns that invoke a personal assistant application may change, a user is capable of providing an updated version of the set of patterns through the user interface. In other examples, the computer-readable medium 500 comprises instructions to cause the system to periodically check for an updated set of patterns through the Internet, and if any, replace the set of patterns with the updated version.

Figure 6:
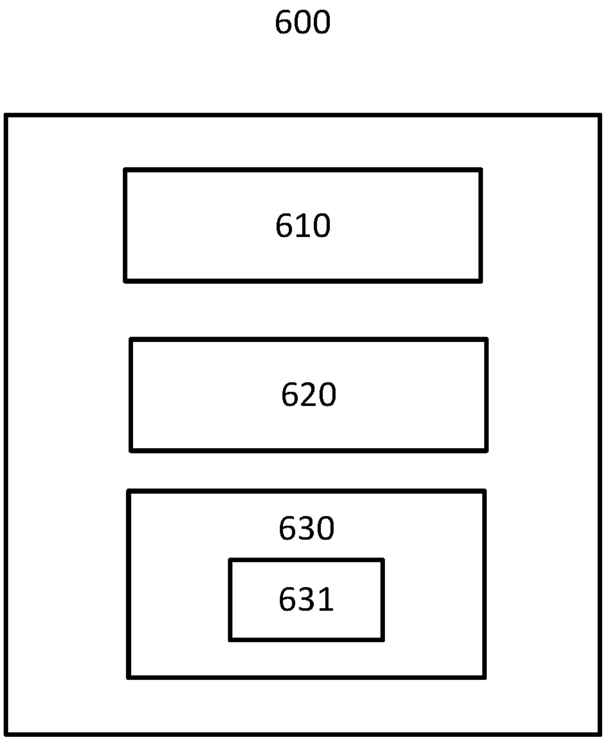
FIG. 6 shows an electronic system comprising an output device, a processor, and a memory, according to an example of the present disclosure.

Referring now to FIG. 6, an electronic system 600 comprising an output device 610, a processor 620, and a memory 630 is shown. The electronic system 600 may be, for instance, a computing system. The output device 610 of the electronic system 600 may be used to output sound associated with sound data, being the sound data generated by the electronic system 600 or by an external device. According to an example, the output device may be a speaker of the electronic system 600 or an external element connected to the electronic system 600 such as an earphone, a headphone, or an external speaker. The memory 630 of the electronic system 600 comprises a set of instructions 631 that, when executed by the processor 620, cause the electronic system 600 to execute a series of actions. The series of actions may comprise identify, within sound data received by the electronic system 600 from an external device, portions of sound data having behavior patterns, execute at least a corrective pattern over the portions of the sound data matching the behavior patterns to create corrected sound data, and transmit the corrected sound data to the output device 610. As previously described, the behavior patterns may be selected from a set of behavior patterns associated with a set of keywords that may be used to invoke at least a personal assistant application. In some examples, the behavior patterns correspond to the acoustic patterns previously described in reference to other examples.

In some examples, memory 620 may comprise further instructions to cause the electronic system 600 to identify portions of data of the audio data that match with a set of patterns of the set of behavior patterns. In an example, identify portions of sound data having behavior patterns comprises comparing a first set of patterns of the portion of sound data with each reference set of patterns of each behavior pattern of the set of behavior patterns within a time frame to determine differences between patterns and determine a behavior likelihood based on the differences. The reference set of patterns may be, for instance, the set of characteristics 300 previously explained in reference with FIG. 3. If the behavior likelihood exceeds a threshold value, a portion of the sound data is considered to include a behavior pattern. In some examples, the behavior likelihood represents an accomplished part of the whole behavior pattern, i.e., how much of a behavior pattern associated with a keyword has been accomplished.

In other examples, the first set of patterns comprises a frequency pattern and an amplitude pattern for the sound data received by the electronic system 600 from the external device, and each reference set of patterns comprises at least a reference frequency pattern, at least a reference amplitude pattern, and at least a cadence time frame. Since multiple combinations of frequency, amplitude and cadence time are possible, a reference set of patterns may comprise different possibilities associated with the same keyword. In further examples, the set of instructions 631 may comprises further instructions to cause the electronic system 600 to apply a frequency filter to apply a frequency filter and a sound energy level filter over the corrected sound data.

In some other examples, the set of instructions 631 of the electronic system 600 correspond to the instructions 510, 520, 530 and 540 previously explained in reference with FIG. 5.

According to other examples, the corrective actions that may be executed over the portion of data including the behavior pattern comprise jamming the portion of data of the first audio stream including the acoustic pattern, omitting the portion of data of the first audio stream including the acoustic pattern, and applying an audio scrambler over the portion of the first audio stream including the acoustic pattern, as previously explained in reference with FIG. 4 and other examples.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A method comprising:

receiving, by an electronic device from an input device, an audio stream that includes a portion containing an incoming acoustic pattern;

computing, by the electronic device, a pattern likelihood that quantifies a degree of similarity between the incoming acoustic pattern and a predefined behavioral pattern;

executing, by the electronic device in response to the pattern likelihood exceeding a threshold value, a corrective action that replaces the incoming acoustic pattern with a modified acoustic pattern; and transmitting, by the electronic device to an output device, the audio stream that includes the modified acoustic pattern in place of the incoming acoustic pattern in the portion of the audio stream.

2. The method of claim 1, further comprising:

applying, by the electronic device while executing the corrective action, a filter over the audio stream, wherein the filter comprises:

filtering frequencies that are outside a frequency range; and filtering energy levels that are outside an energy range.

3. The method of claim 1, wherein the corrective action comprises at least one of:

jamming the portion of data of the audio stream including the incoming acoustic pattern;

omitting the portion of the data of the audio stream including the incoming acoustic pattern; and applying an audio scrambler over the portion of the audio stream including the incoming acoustic pattern.

4. The method of claim 1, wherein computing the pattern likelihood further comprises:

detecting, by the electronic device, presence within the audio stream the incoming acoustic pattern by:

using a data-processing system to detect the portion of the audio stream and identifying the incoming acoustic pattern as the portion of the audio stream.

5. The method of claim 4, wherein the incoming acoustic pattern comprises:

a frequency pattern; and an amplitude pattern, wherein the portion of data of the audio stream is determined to contain an acoustic pattern if the portion of data comprises the frequency pattern and the amplitude pattern within a cadence time frame.

6. The method of claim 5, wherein the electronic device selects the corrective action based on at least one of the frequency pattern, the amplitude pattern, and the cadence time frame.

7. The method of claim 1, wherein calculating the pattern likelihood comprises:

comparing acoustic features of the portion of the incoming audio stream with corresponding features of the predefined behavioral pattern.

8. The method of claim 7, wherein the acoustic features are from the group consisting of frequency, amplitude, and cadence time frame.

9. An electronic system, comprising:

an output device;

a processor;

a memory comprising a set of instructions that, when executed by the processor, cause the electronic system to:

receive, from an input device, an audio stream that includes a portion containing an incoming acoustic pattern, compute a pattern likelihood that quantifies a degree of similarity between the incoming acoustic pattern and a predefined behavioral pattern, execute, in response to the pattern likelihood exceeding a threshold value, a corrective action that replaces the incoming acoustic pattern with a modified acoustic pattern, and transmit, to an output device, the audio stream that includes the modified acoustic pattern in place of the incoming acoustic pattern in the portion of the audio stream.

10. The electronic system of claim 9, wherein identify portions of sound data having behavior patterns comprises:

comparing a first set of patterns of the portion of sound data with each reference set of patterns of each behavior pattern of the set of behavior patterns within a time frame to determine differences between patterns; and determine a behavior likelihood based on the differences, wherein, upon the pattern likelihood exceeds a threshold value, a portion of the sound data is considered to include a behavior pattern.

11. The electronic system of claim 10, wherein:

the first set of patterns comprises a frequency pattern and an amplitude pattern; and each reference set of patterns comprises:

a reference frequency pattern, a reference amplitude pattern, and a cadence time frame.

12. The electronic system of claim 9, wherein the set of instructions comprises further instructions to cause the system to apply a frequency filter and a sound energy level filter over the audio stream.

13. The electronic system of claim 9, wherein the threshold value is a predefined percentage indicating a minimum extent of pattern recognition required to trigger the corrective action.

14. The electronic system of claim 9, wherein the threshold value is a predefined percentage indicating a minimum extent of pattern recognition required to trigger the corrective action.

* * * * *